United States Patent [19]
Aebli et al.

[11] Patent Number: 5,708,852
[45] Date of Patent: Jan. 13, 1998

[54] APPARATUS FOR SERIAL PORT WITH PATTERN GENERATION USING STATE MACHINE FOR CONTROLLING THE REMOVING OF START AND STOP BITS FROM SERIAL BIT DATA STREAM

[75] Inventors: Donna Wiltsey Aebli; James Norris Dieffenderfer, both of Apex, N.C.

[73] Assignee: International Business Machines Corporation, Armonk, N.Y.

[21] Appl. No.: 510,080

[22] Filed: Aug. 1, 1995

[51] Int. Cl.[6] ................................................ G06F 13/00
[52] U.S. Cl. .......................... 395/885; 395/892; 395/436
[58] Field of Search ................................ 395/885, 892, 395/436, 800, 494, 881; 370/470, 463, 359, 466; 365/78; 341/101; 375/371

[56] References Cited

U.S. PATENT DOCUMENTS

| | | | |
|---|---|---|---|
| 4,408,272 | 10/1983 | Walters | 395/881 |
| 4,885,584 | 12/1989 | Dalrymple | 341/101 |
| 4,885,758 | 12/1989 | Speckenbach | 375/371 |
| 4,907,225 | 3/1990 | Gulick et al. | 370/463 |
| 4,943,958 | 7/1990 | Young et al. | 370/466 |
| 5,146,577 | 9/1992 | Babin | 395/494 |
| 5,181,201 | 1/1993 | Schauss et al. | 370/359 |
| 5,195,055 | 3/1993 | Mizuoka et al. | 365/78 |
| 5,371,736 | 12/1994 | Evan | 370/470 |
| 5,454,097 | 9/1995 | Babin | 395/436 |
| 5,566,343 | 10/1996 | Nishiguchi | 395/800 |

*Primary Examiner*—Thomas C. Lee
*Assistant Examiner*—Le Hien Luu
*Attorney, Agent, or Firm*—Steven B. Phillips

[57] ABSTRACT

A serial port having a pattern generation mode and a microprocessor using same. The serial port uses a transmit circuit controlled by a state machine which determines whether start and stop bits are transmitted by a computer implemented method. In pattern generation mode, start and stop bits are not transmitted, and the serial port lends itself to transmitting pulse width modulation data. In one embodiment, the serial port is used in a microprocessor which includes a central processing unit (CPU) and a bus interface unit.

11 Claims, 6 Drawing Sheets

APPARATUS FOR SERIAL PORT WITH PATTERN GENERATION USING STATE MACHINE FOR CONTROLLING THE REMOVING OF START AND STOP BITS FROM SERIAL BIT DATA STREAM

BACKGROUND

1. Field of the Invention

This invention relates to serial ports. In particular, this invention is related to a serial port designed to be integrated onto a semiconductor chip.

2. Description of the Problem

Most general purpose microprocessors have a built-in serial port. A conventional serial port generates streams of data characters under program control. Each character in the data stream is separated by start and stop bits. FIG. 1 shows a representation of such a data stream.

While such a serial port is very useful, users of microprocessors may need to generate a wide variety of bit patterns, since microprocessors today are used in wide ranging applications. Beyond use in traditional computers, microprocessors are designed into everything from automobiles to consumer electronics devices. Serial ports are commonly bundled with a microprocessor on a single chip. Some application designers do not need a serial port but do need pulse width modulation control. Providing two separate pieces of logic to perform both functions can, in cost sensitive designs, be a waste of silicon. It is desirous to use serial port hardware to provide pulse width modulation control. In order to efficiently use a serial port for pulse width modulation, some mechanism must be provided to remove the start and stop bits from the serial bit stream, so that a data stream as shown in FIG. 2 is created.

The generation of pulse width modulation at a serial port can be accomplished by adding external logic to shape a digital signal into an analog signal. German patent DE 4041580 to Weller et. al describes such a scheme. A problem with this arrangement is that the designer must live with start and stop bits in the data stream. What is needed is a microprocessor with a serial port built in which has a normal mode and a pattern generation mode. Ideally, the serial port should be able to be switched between the two modes simply, under program control, preferably by the setting of a single bit on or off.

SUMMARY

The present invention meets the above need by providing a microprocessor serial port which can be set to a pattern generation mode with a single enable bit. The circuit includes an enable terminal, a clock terminal, an output terminal and a frame control terminal. A latch at the output terminal stores a bit to be transmitted. A transmit buffer receives un-framed data for transmission and forwards it to a transmit multiplexer through frame determination logic which determines how to frame the data into individual characters. The frames of data are loaded into a transmit shift register. Bit determination logic is connected between the transmit shift register and the latch to determine whether to transmit a start bit. This decision is controlled by a state machine which is connected to the transmit multiplexer, the frame determination logic, the transmit shift register and the bit determination logic. The state machine receives input from the frame control terminal, a clock terminal, and the pattern generation mode (PGM) enable terminal.

The state machine which controls the data flow for the serial port includes a transmit counter and state machine control logic for controlling the transmit multiplexer and the shift register. A decrementer is connected between the transmit counter and the state machine control logic. Count value determination logic is connected to the frame control terminal and the enable terminal and a count multiplexer is connected between the count value determination logic and the transmit counter. The count multiplexer receives outputs from the count value determination logic and the decrementer as inputs. The initial count value in the transmit counter of the state machine determines whether a stop bit is sent.

In the preferred embodiment, the serial port of the present invention is used in a microprocessor which has bus interfaces, a bus interface unit, a central processing unit (CPU), and optionally, a DMA controller and an interrupt controller. A bus interface unit is connected between the CPU and the bus interfaces. A DMA controller can be connected between the CPU and a DMA control interface and an interrupt controller can be connected between the bus interface unit and an interrupt interface. The transmit circuit for the serial port of the present invention transmits data received from the bus interface unit.

The serial port is operated by the following computer implemented method. The port is initialized and waits for data to be written to the transmit buffer. Data written to the transmit buffer is loaded into the shift register. A determination is made as to whether pattern generation mode is enabled by checking the PGM enable terminal status. If PGM is enabled, the first bit transmitted is the bit after the start bit, which is the first significant bit of the data byte, and a count is loaded into the transmit counter of the state machine so that the transmit counter will not count a stop bit. If PGM is not enabled, the first bit to be transmitted is the start bit and the transmit counter counts a stop bit or stop bits. For each bit, the bit is transmitted, the transmit counter is decremented, the shift register is shifted, and a determination is made as to whether the transmit count is zero. When the transmit count reaches zero, the transmit buffer is checked for additional data. If none has been loaded, the serial port waits for additional data to be loaded.

This invention provides a dual purpose serial port, which can be operated either as a conventional serial port, or in a pattern generation mode. Pattern generation mode is turned on by the setting of a single bit. The pattern generation mode enables the port to be used for pulse width modulation.

DETAILED DESCRIPTION OF THE PREFERRED EMBODIMENT

Figure 1:
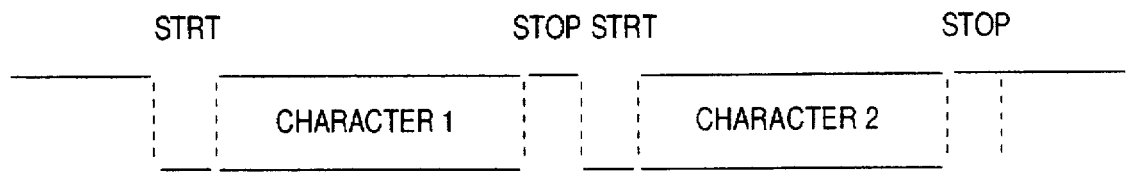
FIG. 1 illustrates a serial bit stream of the prior art.
Figure 2:
FIG. 2 illustrates a serial bit stream made possible by the present invention, in which start and stop bits have been suppressed.
Figure 3:
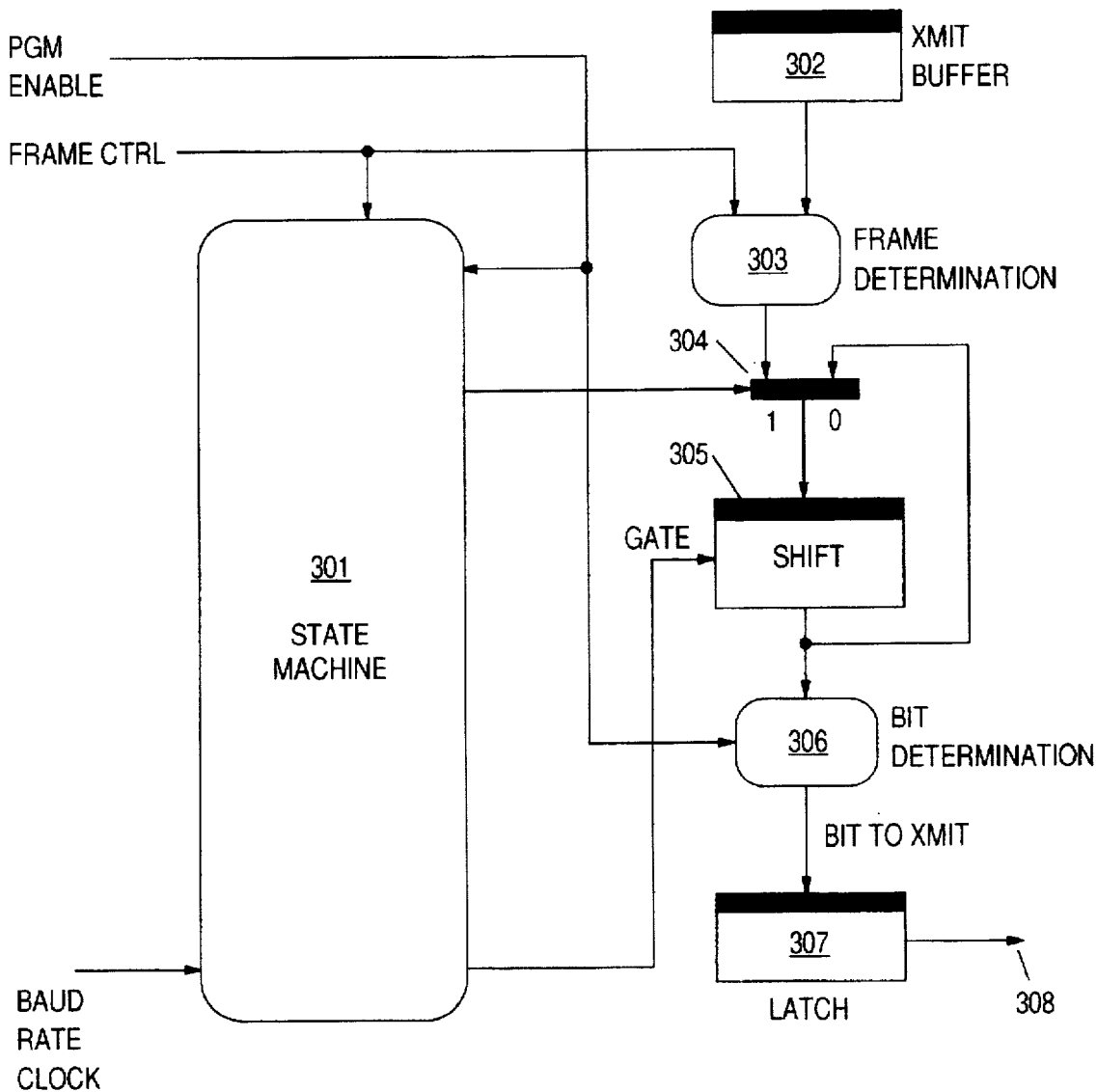
FIG. 3 shows a generalized block diagram of the logic circuit of the present invention.

FIG. 3 shows a circuit block diagram of the transmit circuit for the serial port of the present invention. When the serial port is initialized, data to be transmitted is loaded into the transmit buffer 302. The buffer may consist of a single register which holds seven or eight data bits, or it may consist of a queue of registers, each register holding seven or eight data bits. In addition, an indication of whether pattern generation mode (PGM) is enabled is read at the PGM terminal. Frame control data is presented to the transmit circuit on the frame control terminal. The frame control data consists of an indication of the numbers of data bits and stop bits, and the parity. This information is communicated to a state machine 301 as well as to other logic blocks within the transmit circuit. In the preferred embodiment, the frame control information is communicated via parallel lines, one each used to indicate: the number of data bits; the number of stop bits; whether parity is enabled; and whether parity is odd or even. The state machine 301 keeps a count of how many data bits are transmitted by the serial port and controls the overall flow of data frames through the transmit circuit, as will be described in more detail later. The state machine controls the rate of transmission based on input received over a baud rate clock terminal.

Data from the transmit buffer is formatted into frames by frame determination logic 303. To determine how to frame the data, the frame determination logic uses the frame control settings presented at the frame control terminal. In the preferred embodiment, these settings dictate: whether a frame is to have a seven or eight data bits; whether the parity is enabled; whether the frame is to have one or two stop bits; and whether or not parity is enabled. The frame determination logic 303 appends the appropriate stop, start and parity bits to the data byte, with the most significant bits padded with logical one's if they remain unused.

Figure 5:
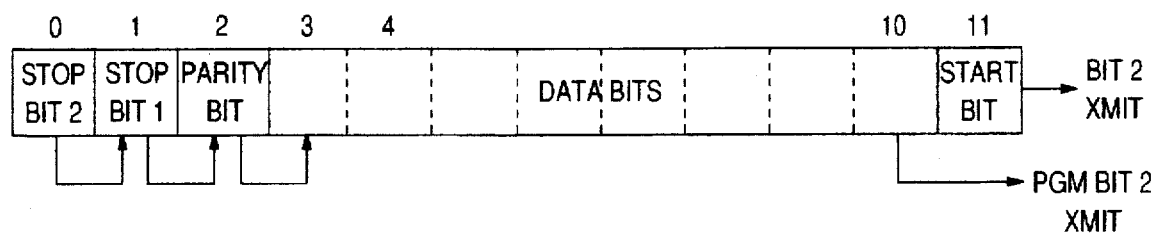
FIG. 5 illustrates a character to be transmitted with the serial port of the present invention and how the various bits are counted.

An example data frame is shown in FIG. 5. This data frame includes an eight bit data byte, two stop bits, a parity bit, and one start bit. This framing results in a 12-bit frame with bits numbered from 0 to 11. Note that in this preferred embodiment, stop and start bits are initially included in the data frame even if PGM is enabled. This data frame is held at the input to multiplexer 304 until it is time for the port to transmit the next character, at which time the multiplexer is activated by the state machine 301 and the frame is loaded into the transmit shift register 305.

Once a frame of data is loaded into the transmit shift register 305, the bit determination logic 306 determines what bit is transmitted first from the data frame, depending on whether PGM is enabled. If PGM is enabled, bit determination logic ignores the start bit 11 of the data frame of FIG. 5 and transmits the second bit in the frame, bit 10, first. In the preferred embodiment, the transmitted bit is momentarily stored in latch 307 before being transmitted by output terminal 308. The latch however is optional; the data can be transmitted directly to the output terminal. Once the first bit of a frame is transmitted, the remaining bits are clocked out of the serial port by the multiplexer 304 and the shift register 305 under the control of the state machine 301 based on a baud rate clock signal received at a baud rate clock terminal. In the preferred embodiment, a gate determines when to load data from the output of the multiplexer based on the baud rate clock signal. The state machine 301 will end transmission of a frame before any stop bits are transmitted if PGM is enabled, as described below.

Figure 4:
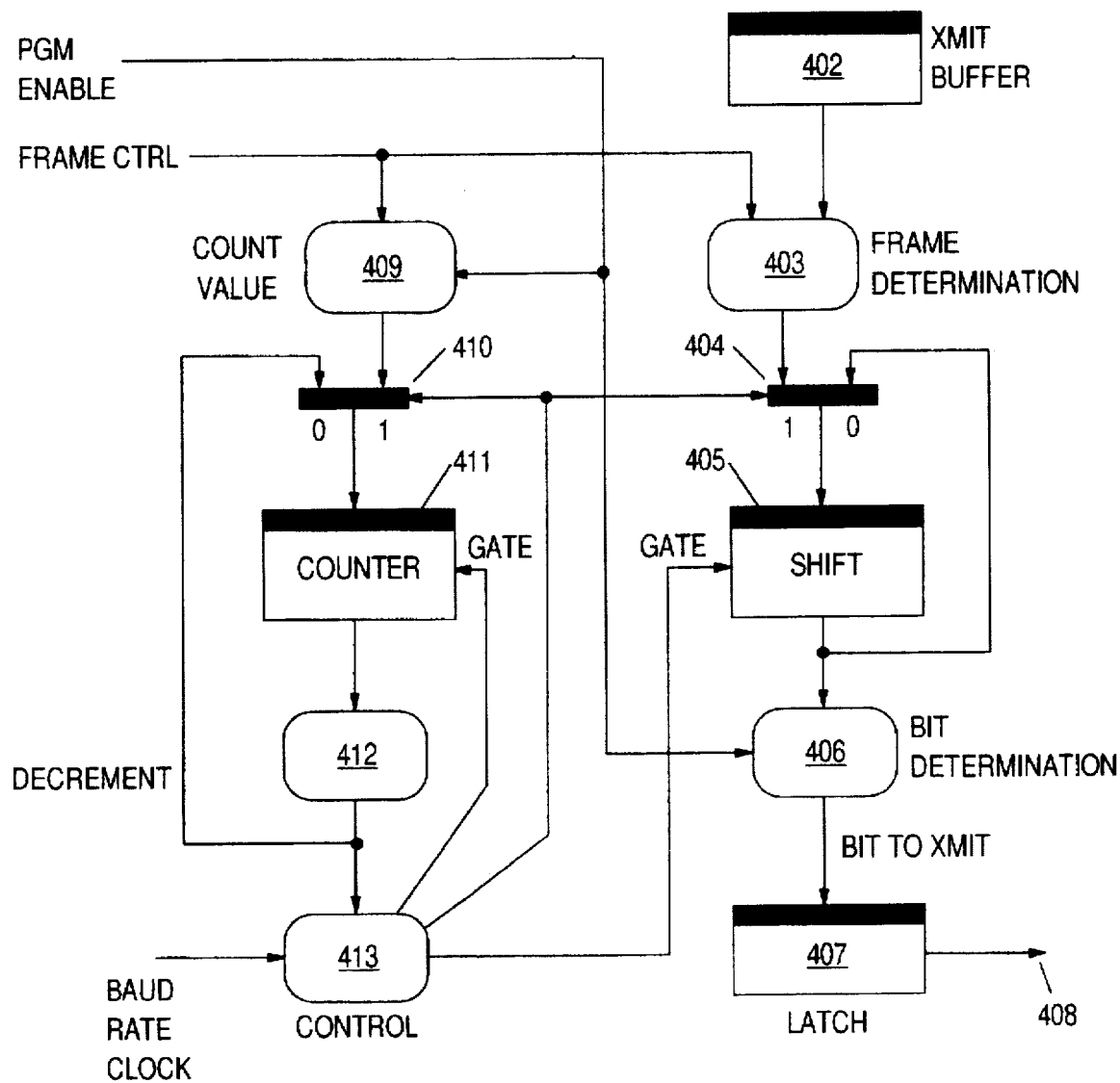
FIG. 4 shows a block diagram of the present invention including the details of the design of the state machine.

FIG. 4 is a block diagram of the transmit circuit of FIG. 3 with the detailed design of the state machine 301 shown. Elements already discussed are given reference numbers which correlate to the reference numbers of FIG. 3. The state machine of the preferred embodiment includes count value determination logic 409, which determines an initial count value to be loaded into the transmit counter 411. The count value determination logic is designed to determine the count based on the frame control data and whether PGM is enabled, according to the following table.

| PGM enable | data bits | parity on | stop bits | I I | Count |
|---|---|---|---|---|---|
| N | 7 | N | 1 | I I | 9 |
| N | 7 | N | 2 | I I | 10 |
| N | 7 | Y | 1 | I I | 10 |
| N | 7 | Y | 2 | I I | 11 |
| N | 8 | N | 1 | I I | 10 |
| N | 8 | N | 2 | I I | 11 |
| N | 8 | Y | 1 | I I | 11 |
| N | 8 | Y | 2 | I I | 12 |
| Y | 7 | N | X | I I | 7 |
| Y | 7 | Y | X | I I | 8 |
| Y | 8 | N | X | I I | 8 |
| Y | 8 | Y | X | I I | 9 |

The count value determined by the count value determination logic is held at the input of count multiplexer 410 until it is loaded into the transmit counter 411 at the same time a data frame is loaded into the transmit shift register 405. In the preferred embodiment, a gate determines when to load the counter with a new or decremented count based on the baud rate clock signal. Decrementer 412 will decrement the count in the transmit counter 411 through the count multiplexer 410 at the same time a bit is clocked out of the serial port based on the baud rate clock signal and present state. When the count reaches zero, the state machine resets the port to transmit another character. Since the initial count is set taking into consideration whether PGM mode is enabled, stop bits are sent if PGM is not enabled, and discarded if PGM is enabled.

State machine control logic 413 is the heart of the state machine and of the transmit circuit. State machine control logic 413 controls the select lines on the multiplexers which determine whether or not the counter and shift register will be loaded with decremented or shifted data, respectively, or with new data for the next frame. State machine control logic 413 also controls the gate on the transmit counter 411 so that the counter will load the decremented value or a new value at the appropriate time based on the input signal received over the baud rate clock terminal. The state machine control logic also controls the gate of the transmit shift register 405 so that the shift register will load either shifted data or new data at the appropriate time based on the input signal received over the baud rate clock terminal.

The circuit described above in its preferred embodiment is integrated on to a semiconductor integrated circuit chip of conventional construction. The integrated circuit chip can be a self-contained serial port chip. The integrated circuit chip can also have other components, as in the case where the circuit is included in a microprocessor, as described later.

Figure 6:
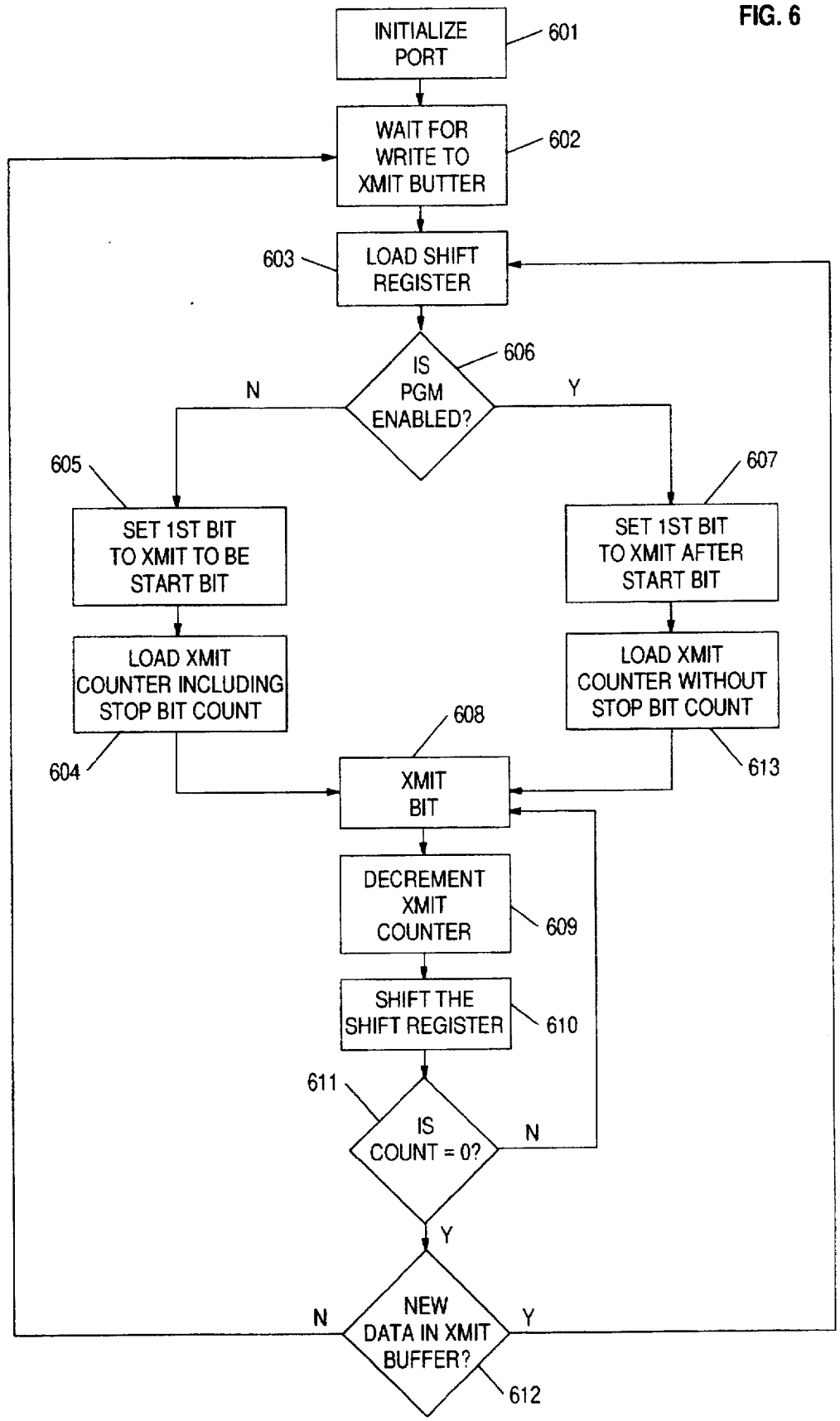
FIG. 6 shows the method of operating the serial port of the present invention.

FIG. 6 illustrates the method performed by the transmit circuit to send frames of data from the serial port. The serial port is initialized at 601 and waits for data to be written to the transmit buffer at 602. During initialization, the baud rate, frame control settings and PGM enable status are determined. When data is written, a frame is loaded into the transmit shift register at 603. At 606 a determination is made as to whether pattern generation mode (PGM) is enabled. If PGM is enabled, the first bit to transmit is set to be the bit after the start bit at 607, position 10 in FIG. 5, and the transmit counter of the state machine is loaded with an appropriate count at 613. If PGM is not enabled, the first bit to be transmitted is set to the start bit at 605, position 11 in FIG. 5, and an appropriate count is loaded into the transmit counter at 604. In either case, for the remaining bits in the frame, a bit is transmitted at 608, the transmit counter is decremented at 609, and the transmit shift register is shifted at 610. For each bit transmitted, a determination is made as to whether the value in the transmit counter has reached zero at 611. If not, another bit is transmitted. If the value in the counter has reached zero, the transmit buffer is checked to determine if there is more data to be transmitted at 612. If there is, the transmit shift register is loaded again. If there is no additional data in the transmit buffer, the serial port resumes waiting for more data.

Figure 7:
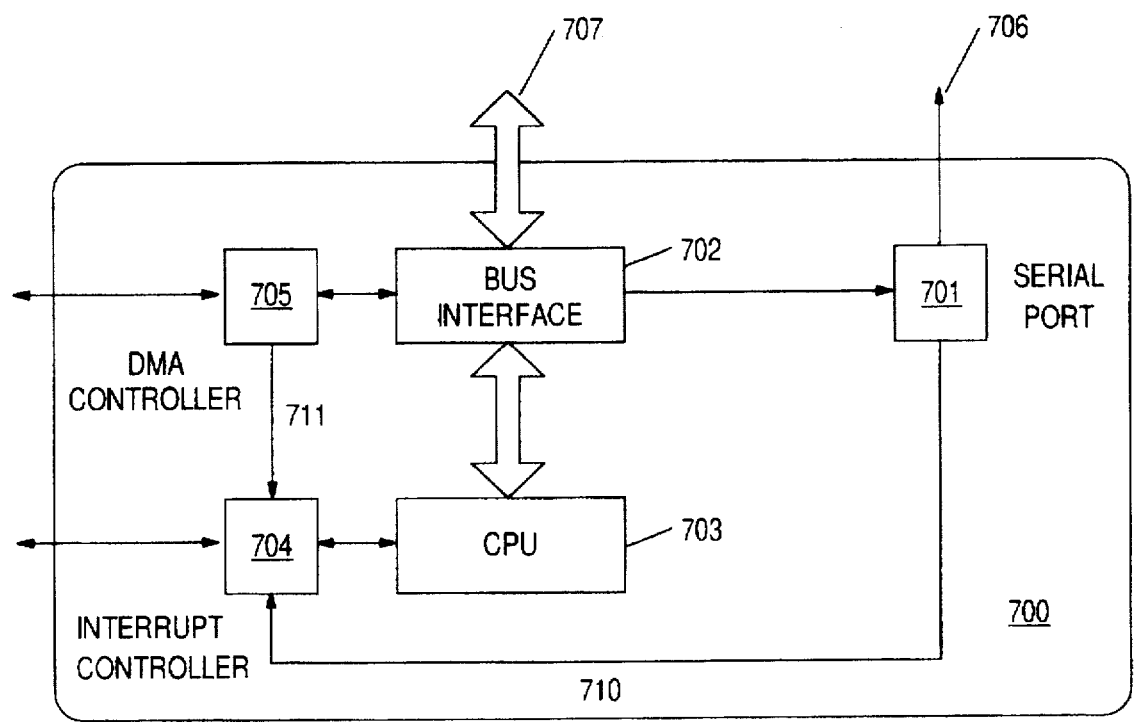
FIG. 7 is a block diagram of a microprocessor in which the serial port of the present invention is employed.

FIG. 7 illustrates a typical operating environment and use for the serial port of the present invention in a microprocessor. The microprocessor can be a general purpose microprocessor, or a special purpose microprocessor such as an embedded controller. In microprocessor 700, central processing unit (CPU) 703 is connected to a bus interface unit 702 which is connected to an external bus interface 707. The bus interface unit 702 is also optionally connected to a direct memory access (DMA) controller 705, which in turn is connected to DMA control interface 708. The CPU 703 is also optionally connected to an interrupt controller 704 which receives interrupts through interrupt interface 709 and from serial port interrupt interface 710 and DMA interrupt interface 711. The serial port of the present invention 701 is disposed between the bus interface unit 702 and an external serial interface 706. The DMA controller 705, if present, and the serial port are also connected to the interrupt controller 704, if present.

We have described a serial port with a pattern generation mode which, in its preferred embodiment, is used in a microprocessor. The serial port can also be built onto a dedicated serial port chip. Those skilled in this art will recognize that the serial port has other embodiments and other uses.

We claim:

1. A transmit circuit for a serial port with a pattern generation mode, the transmit circuit comprising:

an enable terminal;

a frame control terminal;

an output terminal;

a transmit buffer for storing un-framed data to be transmitted;

frame determination logic connected to the frame control terminal and the transmit buffer, the frame determination logic for determining a data frame to be transmitted;

a transmit shift register for storing a frame to be transmitted;

a transmit multiplexer disposed between the frame determination logic and the transmit shift register, the transmit multiplexer receiving as inputs an output from the shift register and an output from the frame determination logic;

bit determination logic disposed between the shift register and a latch, the bit determination logic for determining a next bit to be transmitted; and a state machine connected to the transmit multiplexer, the frame determination logic, the transmit shift register and the bit determination logic, the state machine controlling the data flow from the transmit buffer to the latch so that start and stop bits can be removed from the data and the beginning and ending of frames can be monitored in a pattern generation mode.

2. The transmit circuit of claim 1 wherein the state machine further comprises:

a baud rate clock terminal a transmit counter;

state machine control logic connected to the baud rate clock terminal for controlling the transmit multiplexer and the shift register;

a decrementer disposed between the transmit counter and the state machine control logic;

count value determination logic connected to the frame control terminal and the enable terminal; and a count multiplexer disposed between the count value determination logic and the transmit counter, the count multiplexer being controlled by the state machine control logic and receiving as inputs an output from the count value determination logic and an output from the decrementer.

3. A microprocessor having a serial port with pattern generation mode, the microprocessor comprising:

bus interfaces;

a serial interface;

a central processing unit (CPU) for performing computations and controlling data flow;

a bus interface unit disposed between the CPU and the bus interfaces; and a serial port disposed between the bus interface unit and the serial interface, the serial port having a transmit circuit further including:

an enable terminal;

a frame control terminal;

an output terminal;

a transmit buffer for storing un-framed data to be transmitted;

frame determination logic connected to the frame control terminal and the transmit buffer, the frame determination logic for determining a data frame to be transmitted;

a transmit shift register for storing a frame to be transmitted;

a transmit multiplexer disposed between the frame determination logic and the transmit shift register, the transmit multiplexer receiving as inputs an output from the shift register and an output from the frame determination logic;

bit determination logic disposed between the shift register and a latch, the bit determination logic for determining a next bit to be transmitted; and a state machine connected to the transmit multiplexer, the frame determination logic, the transmit shift register and the bit determination logic, the state machine controlling the data flow from the transmit buffer to the latch so that start and stop bits can be removed from the data and the beginning and ending of frames can be monitored in a pattern generation mode.

4. The microprocessor of claim 3 wherein the state machine further comprises:

a baud rate clock terminal;

a transmit counter;

state machine control logic connected to the baud rate clock terminal for controlling the transmit multiplexer and the shift register;

a decrementer disposed between the transmit counter and the state machine control logic;

count value determination logic connected to the frame control terminal and the enable terminal; and a count multiplexer disposed between the count value determination logic and the transmit counter, the count multiplexer being controlled by the state machine control logic and receiving as inputs an output from the count value determination logic and an output from the decrementer.

5. The microprocessor according to claims 3 or 4 further comprising:

an interrupt interface;

a direct memory access (DMA) control interface;

a DMA controller disposed between the bus interface unit and the DMA control interface; and an interrupt controller disposed between the CPU and the interrupt interface.

6. A computer implemented method of operating a serial port with a pattern generation mode, the method comprising the steps of:

initializing the serial port;

waiting for data to be written to a transmit buffer;

loading data from the transmit buffer to a shift register;

determining if the pattern generation mode of the serial port is enabled;

if the pattern generation mode of the serial port is enabled, setting a first bit to transmit to be a bit after a start bit;

if the pattern generation mode of the serial port is enabled, loading a count into a transmit counter, so that the transmit counter does not count a stop bit;

transmitting a bit;

decrementing the transmit counter;

shifting the shift register;

determining if a transmit count is equal to zero; and if the transmit count is not equal to zero, transmitting a bit.

7. The method of claim 6 further comprising the steps of:

if the pattern generation mode of the serial port is not enabled, setting the first bit to transmit to be the start bit; and if the pattern generation mode of the serial port is not enabled, loading a count into the transmit counter so that the counter counts the stop bit.

8. The method according to claim 6 further comprising the steps of:

if the transmit count is equal to zero, determining if the transmit buffer contains additional data; and if the transmit buffer contains additional data, loading the shift register.

9. The method according to claim 8 further comprising the step of:

if the transmit buffer does not contain additional data, waiting for data to be written to the transmit buffer.

10. The method according to claim 7 further comprising the steps of:

if the transmit count is equal to zero, determining if the transmit buffer contains additional data; and if the transmit buffer contains additional data, loading the shift register.

11. The method according to claim 10 further comprising the step of:

if the transmit buffer does not contain additional data, waiting for data to be written to the transmit buffer.

* * * * *